US009118658B2

(12) United States Patent
Holtmanns et al.

(10) Patent No.: US 9,118,658 B2
(45) Date of Patent: Aug. 25, 2015

(54) METHODS AND APPARATUSES FOR ACCESS CREDENTIAL PROVISIONING

(75) Inventors: Silke Holtmanns, Klaukkala (FI); André Dolenc, Espoo (FI)

(73) Assignee: Nokia Corporation, Espoo (FI)

( * ) Notice: Subject to any disclaimer, the term of this patent is extended or adjusted under 35 U.S.C. 154(b) by 26 days.

(21) Appl. No.: 13/876,641

(22) PCT Filed: Sep. 29, 2010

(86) PCT No.: PCT/IB2010/054403
§ 371 (c)(1),
(2), (4) Date: Mar. 28, 2013

(87) PCT Pub. No.: WO2012/042300
PCT Pub. Date: Apr. 5, 2012

(65) Prior Publication Data
US 2013/0205134 A1 Aug. 8, 2013

(51) Int. Cl.
*H04L 29/06* (2006.01)
*H04W 4/00* (2009.01)
*H04W 12/04* (2009.01)
*H04W 8/24* (2009.01)

(52) U.S. Cl.
CPC .......... *H04L 63/0823* (2013.01); *H04W 4/001* (2013.01); *H04W 12/04* (2013.01); *H04W 4/003* (2013.01); *H04W 8/245* (2013.01)

(58) Field of Classification Search
CPC . H04L 63/10; H04L 2209/76; H04L 12/2424; H04L 63/0823; G06F 21/44; H04W 4/001; H04W 4/003; H04W 8/245; H04W 12/04
See application file for complete search history.

(56) References Cited

U.S. PATENT DOCUMENTS

| | | | |
|---|---|---|---|
| 2005/0261012 A1* | 11/2005 | Weiser | 455/466 |
| 2006/0230265 A1 | 10/2006 | Krishna | |
| 2006/0281542 A1* | 12/2006 | Aird et al. | 463/29 |
| 2008/0260149 A1* | 10/2008 | Gehrmann | 380/247 |
| 2009/0158032 A1 | 6/2009 | Costa et al. | |

(Continued)

FOREIGN PATENT DOCUMENTS

| | | |
|---|---|---|
| CN | 101568098 A | 10/2009 |
| EP | 0778716 A2 | 6/1997 |
| EP | 1361775 A1 | 11/2003 |

OTHER PUBLICATIONS

International Search Report and Written Opinion received in corresponding Patent Cooperation Treaty Application No. PCT/IB2010/054403, dated Apr. 13, 2011. 14 pages.

*Primary Examiner* — Andrew Nalven
*Assistant Examiner* — Mary Li
(74) *Attorney, Agent, or Firm* — Mintz Levin Cohn Ferris Glovsky and Popeo, P.C.

(57) ABSTRACT

Methods and apparatuses are provided for access credential provisioning. A method may include causing a trusted device identity for a mobile apparatus to be provided to an intermediary apparatus. The intermediary apparatus may serve as an intermediary between the mobile apparatus and a provisioning apparatus for a network. The method may further include receiving, from the intermediary apparatus, network access credential information for the network. The network access credential information may be provisioned to the mobile apparatus by the provisioning apparatus based at least in part on the trusted device identity. Corresponding apparatuses are also provided.

17 Claims, 8 Drawing Sheets

(56) References Cited

U.S. PATENT DOCUMENTS

| | | | |
|---|---|---|---|
| 2009/0205028 A1* | 8/2009 | Smeets et al. | 726/6 |
| 2010/0095359 A1* | 4/2010 | Gordon | 726/6 |
| 2010/0266128 A1* | 10/2010 | Asokan et al. | 380/278 |

* cited by examiner

METHODS AND APPARATUSES FOR ACCESS CREDENTIAL PROVISIONING

RELATED APPLICATION

This application was originally filed as PCT Application No. PCT/IB2010/054403 filed Sep. 29, 2010.

TECHNOLOGICAL FIELD

Example embodiments of the present invention relate generally to communications technology and, more particularly, relate to methods and apparatuses for access credential provisioning.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

An operator of a network may require a mobile computing device to be provisioned with network access credentials as a condition for granting access or usage privileges for the network to the mobile computing device. For example, a network operator may charge an access or other usage fee to a user of a mobile computing device and provision network access credentials only to paying customers.

BRIEF SUMMARY

Systems, methods, apparatuses, and computer program products are herein provided for access credential provisioning. Systems, methods, apparatuses, and computer program products in accordance with various embodiments may provide several advantages to computing devices, computing device users, vendors, and network operators. In this regard, some example embodiments may facilitate provision of network access credentials in a manner that may be user friendly while not requiring changes to core network entities or to an access network. More particularly, some example embodiments enable connection of a mobile apparatus to an intermediary apparatus configured to interface with a provisioning apparatus for a network and facilitate provisioning of network access credentials by the provisioning apparatus to the mobile apparatus. The intermediary apparatus according to some example embodiments does not require changes to core network entities or to an access network. Further, an intermediary apparatus according to some example embodiments is configured to facilitate provisioning of network access credential information without requiring a user of the mobile apparatus to know how to obtain network access credentials for the mobile apparatus.

In a first example embodiment, a method is provided, which comprises causing a trusted device identity for a mobile apparatus to be provided to an intermediary apparatus. The intermediary apparatus of this example embodiment is configured to serve as an intermediary between the mobile apparatus and a provisioning apparatus for a network. The method of this example embodiment further comprises receiving, from the intermediary apparatus, network access credential information for the network. The network access credential information of this example embodiment is provisioned to the mobile apparatus by the provisioning apparatus based at least in part on the trusted device identity.

In another example embodiment, an apparatus comprising at least one processor and at least one memory storing computer program code is provided. The at least one memory and stored computer program code are configured, with the at least one processor, to cause the apparatus of this example embodiment to at least cause a trusted device identity for the apparatus to be provided to an intermediary apparatus. The intermediary apparatus of this example embodiment is configured to serve as an intermediary between the apparatus and a provisioning apparatus for a network. The at least one memory and stored computer program code are configured, with the at least one processor, to further cause the apparatus of this example embodiment to receive, from the intermediary apparatus, network access credential information for the network. The network access credential information of this example embodiment is provisioned to the apparatus by the provisioning apparatus based at least in part on the trusted device identity.

In another example embodiment, a computer program product is provided. The computer program product of this example embodiment includes at least one computer-readable storage medium having computer-readable program instructions stored therein. The program instructions of this example embodiment comprise program instructions configured to cause a trusted device identity for a mobile apparatus to be provided to an intermediary apparatus. The intermediary apparatus of this example embodiment is configured to serve as an intermediary between the mobile apparatus and a provisioning apparatus for a network. The program instructions of this example embodiment further comprise program instructions configured to cause receipt, from the intermediary apparatus, of network access credential information for the network. The network access credential information of this example embodiment is provisioned to the mobile apparatus by the provisioning apparatus based at least in part on the trusted device identity.

In another example embodiment, an apparatus is provided that comprises means for causing a trusted device identity for the apparatus to be provided to an intermediary apparatus. The intermediary apparatus of this example embodiment is configured to serve as an intermediary between the apparatus and a provisioning apparatus for a network. The apparatus of this example embodiment further comprises means for receiving, from the intermediary apparatus, network access credential information for the network. The network access credential information of this example embodiment is provisioned to the apparatus by the provisioning apparatus based at least in part on the trusted device identity.

In another example embodiment, a method is provided, which comprises receiving, from a mobile apparatus, a trusted device identity for the mobile apparatus. The method of this example embodiment further comprises causing the trusted device identity to be provided to a provisioning apparatus for a network. The method of this example embodiment additionally comprises receiving network access credential information for the network. The network access credential information of this example embodiment is provisioned to the mobile apparatus by the provisioning apparatus based at least in part on the trusted device identity. The method of this example embodiment also comprises causing the network access credential information to be provided to the mobile apparatus.

In another example embodiment, an apparatus comprising at least one processor and at least one memory storing computer program code is provided. The at least one memory and stored computer program code are configured, with the at least one processor, to cause the apparatus of this example embodiment to at least receive, from a mobile apparatus, a trusted device identity for the mobile apparatus. The at least one memory and stored computer program code are configured, with the at least one processor, to further cause the apparatus of this example embodiment to cause the trusted device identity to be provided to a provisioning apparatus for a network. The at least one memory and stored computer program code are configured, with the at least one processor, to also cause the apparatus of this example embodiment to receive network access credential information for the network. The network access credential information of this example embodiment is provisioned to the mobile apparatus by the provisioning apparatus based at least in part on the trusted device identity. The at least one memory and stored computer program code are configured, with the at least one processor, to additionally cause the apparatus of this example embodiment to cause the network access credential information to be provided to the mobile apparatus.

In another example embodiment, a computer program product is provided. The computer program product of this example embodiment includes at least one computer-readable storage medium having computer-readable program instructions stored therein. The program instructions of this example embodiment comprise program instructions configured to receive, from a mobile apparatus, a trusted device identity for the mobile apparatus. The program instructions of this example embodiment further comprise program instructions configured to cause the trusted device identity to be provided to a provisioning apparatus for a network. The program instructions of this example embodiment also comprise program instructions configured to receive network access credential information for the network. The network access credential information of this example embodiment is provisioned to the mobile apparatus by the provisioning apparatus based at least in part on the trusted device identity. The program instructions of this example embodiment additionally comprise program instructions configured to cause the network access credential information to be provided to the mobile apparatus.

In another example embodiment, an apparatus is provided that comprises means for receiving, from a mobile apparatus, a trusted device identity for the mobile apparatus. The apparatus of this example embodiment further comprises means for causing the trusted device identity to be provided to a provisioning apparatus for a network. The apparatus of this example embodiment additionally comprises means for receiving network access credential information for the network. The network access credential information of this example embodiment is provisioned to the mobile apparatus by the provisioning apparatus based at least in part on the trusted device identity. The apparatus of this example embodiment also comprises means for causing the network access credential information to be provided to the mobile apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1:
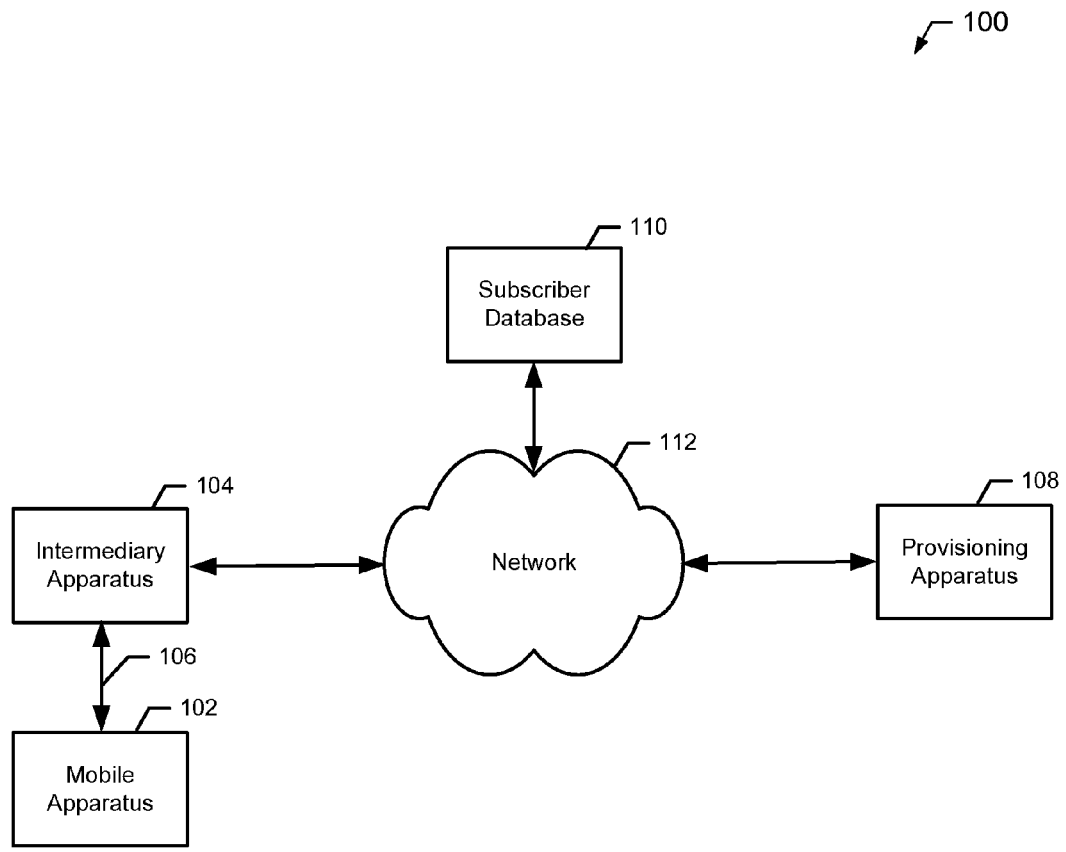
FIG. 1 illustrates a system for access credential provisioning according to some example embodiments.

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media may include, for example, coaxial cables, copper wire, fiber optic cables, and carrier waves that travel through space without wires or cables, such as acoustic waves and electromagnetic waves, including radio, optical and infrared waves. Signals may include man-made transient variations in amplitude, frequency, phase, polarization or other physical properties transmitted through the transmission media. Examples of computer-readable media may include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

In order to access a network, such as a cellular network, a mobile apparatus may need to acquire network access credentials. Provision of network access credentials to a mobile apparatus may be controlled by a network operator. Accordingly, a user of a mobile apparatuses may need to acquire network access credentials when first purchasing or activating the mobile apparatus and/or when roaming with a mobile apparatus to a region covered by a network operated by a different network operator. Acquisition of a network access credentials may pose a hurdle for unsophisticated mobile apparatus users. As such, some example embodiments provide novel systems, methods, apparatuses, and computer program products for access credential provisioning.

Referring now to FIG. 1, FIG. 1 illustrates a block diagram of a system 100 for access credential provisioning according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for access credential provisioning, numerous other configurations may also be used to implement embodiments of the present invention.

In some example embodiments, the system 100 may include a mobile apparatus 102 and intermediary apparatus 104. The mobile apparatus 102 and server apparatus 104 may be configured to establish a local connection 106 and exchange data over the local connection 106. The local connection 106 may, for example, comprise a wired or wireless local connection between the mobile apparatus 102 and intermediary apparatus 104. By way of non-limiting example, the local connection 106 may comprise a universal serial bus (USB) connection, Institute of Electrical and Electronics Engineers (IEEE) 1394 connection, serial connection, parallel connection, wireless USB connection, Bluetooth connection, radio frequency connection, Infrared Data Association (IrDA) connection, or the like. In this regard, the local connection 106 may comprise any connection by which the mobile apparatus 102 and intermediary apparatus 104 may exchange data.

The mobile apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. In this regard, the mobile apparatus 102 may be embodied as any computing device configured to access a network, such as a cellular network, when configured with access credential information provisioned by an operator of the network.

The intermediary apparatus 104 may be embodied as any computing device, such as, for example, a desktop computer, laptop computer, mobile terminal, mobile computer, mobile phone, mobile communication device, a chipset, an apparatus comprising a chipset, any combination thereof, and/or the like. In this regard, the intermediary apparatus 104 may comprise any computing device configured to exchange data with a mobile apparatus 102 via a local connection 106 and to engage in communication with a provisioning apparatus 108 via the network 112, as will be further described herein below. In some example embodiments, the intermediary apparatus 104 comprises a computing device located at a point of sale where the mobile apparatus 102 and/or network access rights (for example, a subscription) for using the mobile apparatus 102 on a network may be purchased.

The system 100 may further comprise a provisioning apparatus 108. The provisioning apparatus 108 may be embodied as one or more servers, a server cluster, a cloud computing infrastructure, one or more desktop computers, one or more laptop computers, one or more network nodes, multiple computing devices in communication with each other, a chipset, an apparatus comprising a chipset, any combination thereof, and/or the like. In some example embodiments, the provisioning apparatus 108 may comprise an entity operated by a network operator that is configured to provision access credentials for a network to a mobile apparatus 102.

The intermediary apparatus 104 and provisioning apparatus 108 may be configured to communicate over the network 112. The network 112 may comprise one or more wireless networks (for example, a cellular network, wireless local area network, wireless personal area network, wireless metropolitan area network, and/or the like), one or more wireline networks, or some combination thereof, and in some embodiments comprises at least a portion of the internet. Accordingly, the intermediary apparatus 104 and provisioning apparatus 108 may, for example, be configured to communicate over the network 112 via email, short message service, internet protocol communication, some combination thereof, or the like.

The system 100 may additionally comprise a subscriber database 110. The subscriber database 110 may, for example, comprise a Home Subscriber Server (HSS), Home Location Register (HLR), Authentication, Authorization, and Accounting (AAA) server, some combination thereof, and/or the like. In this regard, the subscriber database 110 may, for example, comprise a database of access credential information for mobile apparatuses 110 and/or users thereof that may be maintained by a network operator. For example, the subscriber database 110 may comprise an equipment identity register (EIR). In some example embodiments, the provisioning apparatus 108 and subscriber database 110 may be co-located. In embodiments wherein the provisioning apparatus 108 and subscriber database 110 are not co-located, the provisioning apparatus 108 and subscriber database 110 may be configured to communicate and exchange data over the network 112 or other network.

Figure 2:
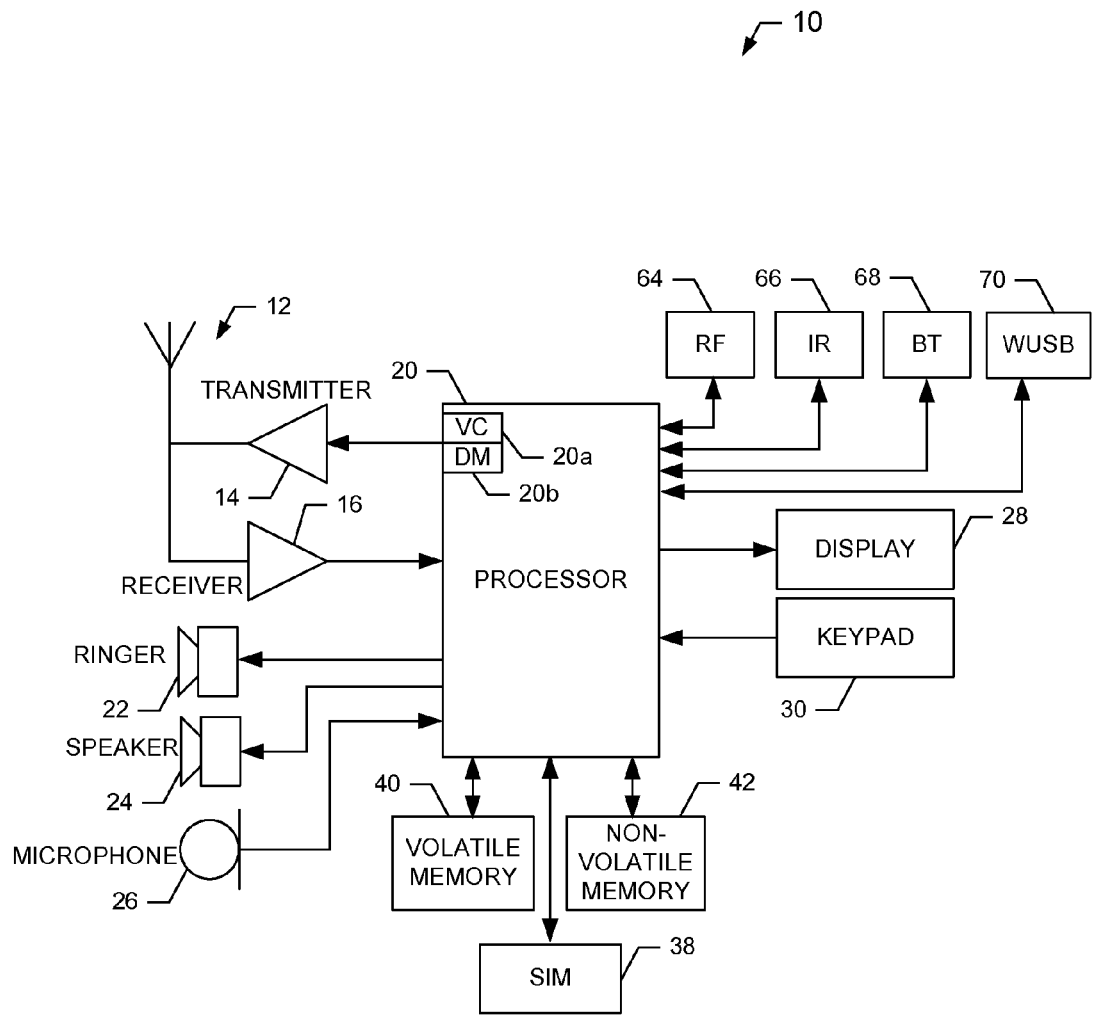
FIG. 2 is a schematic block diagram of a mobile terminal according to some example embodiments.

According to some example embodiments, the mobile apparatus 102 is embodied as a mobile terminal, such as that illustrated in FIG. 2. In this regard, FIG. 2 illustrates a block diagram of a mobile terminal 10 representative of some embodiments of a mobile apparatus 102. It should be understood, however, that the mobile terminal 10 illustrated and hereinafter described is merely illustrative of one type of mobile apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
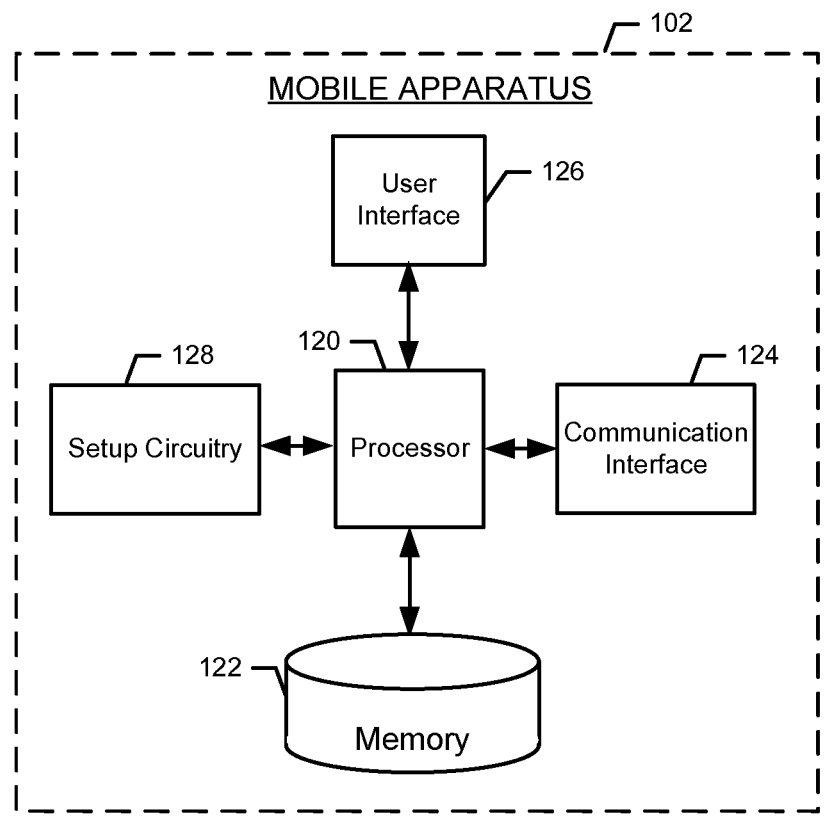
FIG. 3 illustrates a block diagram of a mobile apparatus according to some example embodiments.

Referring now to FIG. 3, FIG. 3 illustrates a block diagram of a mobile apparatus 102 according to some example embodiments. In some example embodiments, the mobile apparatus 102 may include various means for performing the various functions herein described. These means may comprise one or more of a processor 120, memory 122, communication interface 124, user interface 126, or setup circuitry 128. The means of the mobile apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 3 may be embodied as a chip or chip set. In other words, the mobile apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, and/or setup circuitry 128 may be embodied as a chip or chip set. The mobile apparatus 102 may therefore, in some example embodiments, be configured to implement embodiments of the present invention on a single chip or as a single "system on a chip." As another example, in some example embodiments, the mobile apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some example embodiments the processor 120 comprises a plurality of processors. The plurality of processors may be in operative communication with each other and may be collectively configured to perform one or more functionalities of the mobile apparatus 102 as described herein. The plurality of processors may be embodied on a single computing device or distributed across a plurality of computing devices collectively configured to function as the mobile apparatus 102. In embodiments wherein the mobile apparatus 102 is embodied as a mobile terminal 10, the processor 120 may be embodied as or comprise the processor 20. In some example embodiments, the processor 120 is configured to execute instructions stored in the memory 122 or otherwise accessible to the processor 120. These instructions, when executed by the processor 120, may cause the mobile apparatus 102 to perform one or more of the functionalities of the mobile apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the mobile apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the mobile apparatus 102 is embodied as a mobile terminal 10, the memory 122 may comprise the volatile memory 40 and/or the non-volatile memory 42. The memory 122 may be configured to store information, data, applications, instructions, or the like for enabling the mobile apparatus 102 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the setup circuitry 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. According to some example embodiments, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the mobile apparatus 102 and one or more computing devices or computing resources may be in communication. As an example, the communication interface 124 may be configured to enable communication between the mobile apparatus 102 and the intermediary apparatus 104 via a local connection 106. The communication interface 124 may additionally be in communication with the memory 122, user interface 126, and/or setup circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the user interface 126 comprises a touch screen display, the user interface 126 may additionally be configured to detect and/or receive an indication of a touch gesture or other input to the touch screen display. The user interface 126 may be in communication with the memory 122, communication interface 124, and/or setup circuitry 128, such as via a bus.

The setup circuitry 128 may be embodied as various means, such as circuitry, hardware, a computer program product comprising computer readable program instructions stored on a computer readable medium (for example, the memory 122) and executed by a processing device (for example, the processor 120), or some combination thereof and, in some example embodiments, is embodied as or otherwise controlled by the processor 120. In embodiments wherein the setup circuitry 128 is embodied separately from the processor 120, the setup circuitry 128 may be in communication with the processor 120. The setup circuitry 128 may further be in communication with one or more of the memory 122, communication interface 124, or user interface 126, such as via a bus.

Figure 4:
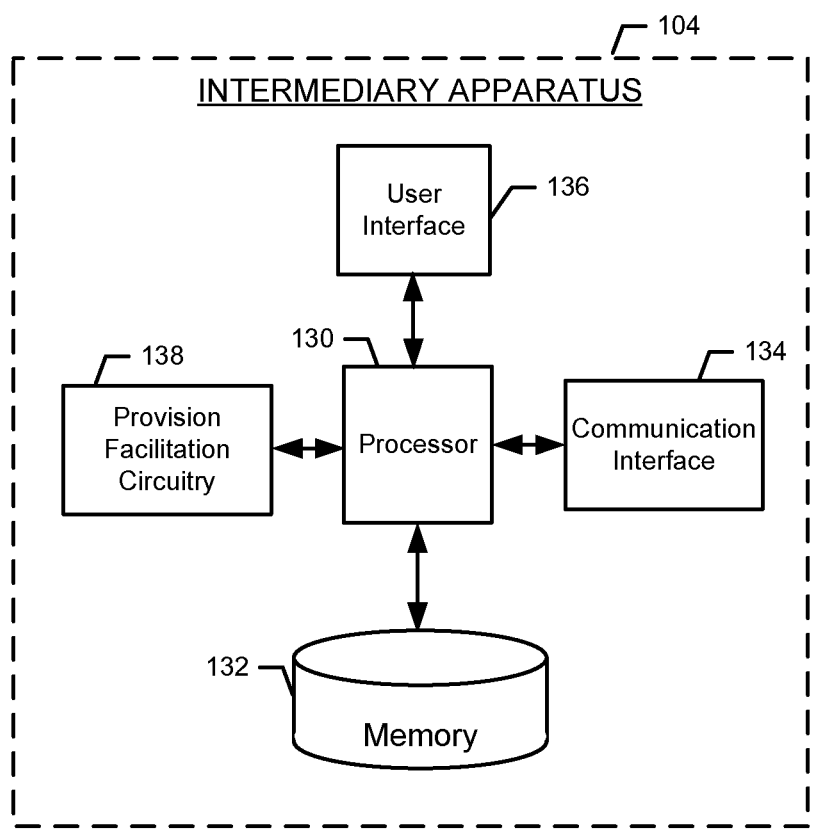
FIG. 4 illustrates a block diagram of an intermediary apparatus according to some example embodiments.

Referring now to FIG. 4, FIG. 4 illustrates a block diagram of an intermediary apparatus 104 according to some example embodiments. In some example embodiments, the intermediary apparatus 104 may include various means for performing the various functions herein described. These means may comprise one or more of a processor 130, memory 132, communication interface 134, user interface 136, or provision facilitation circuitry 138. The means of the intermediary apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 132) that is executable by a suitably configured processing device (for example, the processor 130), or some combination thereof.

In some example embodiments, one or more of the means illustrated in FIG. 4 may be embodied as a chip or chip set. In other words, the intermediary apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, communication interface 134, user interface 136, and/or provision facilitation circuitry 138 may be embodied as a chip or chip set. The intermediary apparatus 104 may therefore, in some example embodiments, be configured to implement example embodiments of the present invention on a single chip or as a single "system on a chip." As another example, in some example embodiments, the intermediary apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some example embodiments the processor 130 comprises a plurality of processors. The plurality of processors may be in operative communication with each other and may be collectively configured to perform one or more functionalities of the intermediary apparatus 104 as described herein. The plurality of processors may be embodied on a single computing device or distributed across a plurality of computing devices collectively configured to function as the intermediary apparatus 104. In some example embodiments, the processor 130 is configured to execute instructions stored in the memory 132 or otherwise accessible to the processor 130. These instructions, when executed by the processor 130, may cause the intermediary apparatus 104 to perform one or more of the functionalities of the intermediary apparatus 104 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 4 as a single memory, the memory 132 may comprise a plurality of memories. The plurality of memories may be embodied on a single computing device or may be distributed across a plurality of computing devices collectively configured to function as the intermediary apparatus 104. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the intermediary apparatus 104 to carry out various functions in accordance with various example embodiments. For example, in some example embodiments, the memory 132 is configured to buffer input data for processing by the processor 130. Additionally or alternatively, the memory 132 may be configured to store program instructions for execution by the processor 130. The memory 132 may store information in the form of static and/or dynamic information. This stored information may be stored and/or used by the provision facilitation circuitry 138 during the course of performing its functionalities.

The communication interface 134 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. According to some example embodiments, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more remote computing devices. The communication interface 134 may be configured to receive and/or transmit data using any protocol that may be used for communications between computing devices. In this regard, the communication interface 134 may be configured to receive and/or transmit data using any protocol that may be used for transmission of data over a wireless network, wireline network, some combination thereof, or the like by which the intermediary apparatus 104 and one or more computing devices or computing resources may be in communication. As an example, the communication interface 134 may be configured to enable communication between the intermediary apparatus 104 and a mobile apparatus 102 via a local connection 106. As a further example, the communication interface 134 may be configured to enable communication between the intermediary apparatus 104 and the provisioning apparatus 108 via the network 112. The communication interface 134 may additionally be in communication with the memory 132, user interface 136, and/or provision facilitation circuitry 138, such as via a bus.

The user interface 136 may be in communication with the processor 130 to receive an indication of a user input and/or to provide an audible, visual, mechanical, or other output to a user. As such, the user interface 136 may include, for example, a keyboard, a mouse, a joystick, a display, a touch screen display, a microphone, a speaker, and/or other input/output mechanisms. In embodiments wherein the user interface 136 comprises a touch screen display, the user interface 136 may additionally be configured to detect and/or receive an indication of a touch gesture or other input to the touch screen display. The user interface 136 may be in communication with the memory 132, communication interface 134, and/or provision facilitation circuitry 138, such as via a bus.

The provision facilitation circuitry 138 may be embodied as various means, such as circuitry, hardware, a computer program product comprising computer readable program instructions stored on a computer readable medium (for example, the memory 132) and executed by a processing device (for example, the processor 130), or some combination thereof and, in some example embodiments, is embodied as or otherwise controlled by the processor 130. In embodiments wherein the provision facilitation circuitry 138 is embodied separately from the processor 130, the provision facilitation circuitry 138 may be in communication with the processor 130. The provision facilitation circuitry 138 may further be in communication with one or more of the memory 132, communication interface 134, or user interface 136, such as via a bus.

Figure 5:
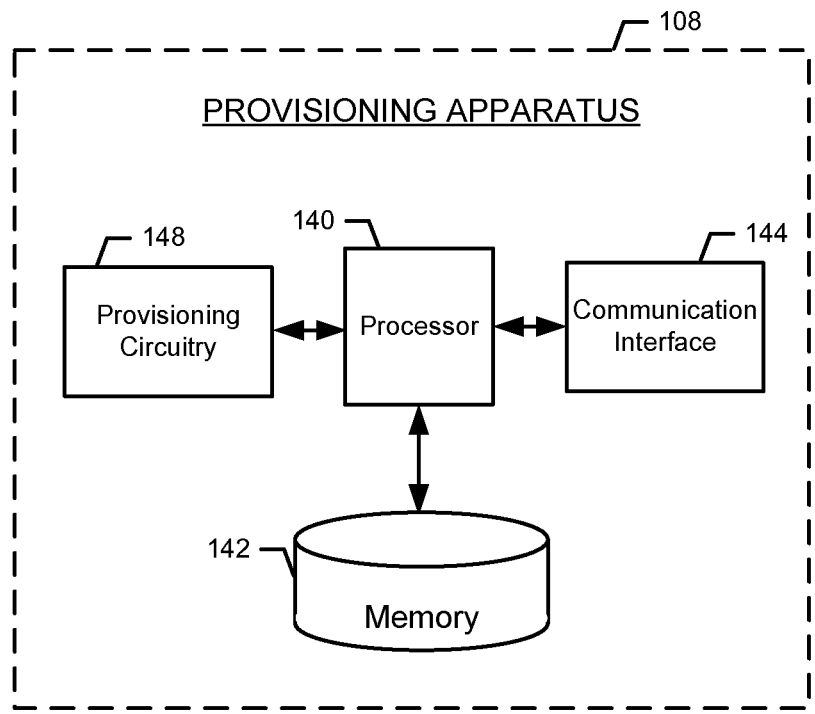
FIG. 5 illustrates a block diagram of a provisioning apparatus according to some example embodiments.

FIG. 5 illustrates a block diagram of a provisioning apparatus 108 according to some example embodiments. In some example embodiments, the provisioning apparatus 108 may include various means for performing the various functions herein described. These means may comprise one or more of a processor 140, memory 142, communication interface 144, or provisioning circuitry 148. The means of the provisioning apparatus 108 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 142) that is executable by a suitably configured processing device (for example, the processor 140), or some combination thereof.

In some example embodiments, one or more of the means illustrated in FIG. 5 may be embodied as a chip or chip set. In other words, the provisioning apparatus 108 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 140, memory 142, communication interface 144, and/or provisioning circuitry 148 may be embodied as a chip or chip set. The provisioning apparatus 108 may therefore, in some example embodiments, be configured to implement embodiments of the present invention on a single chip or as a single "system on a chip." As another example, in some example embodiments, the provisioning apparatus 108 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 140 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 5 as a single processor, in some example embodiments the processor 140 comprises a plurality of processors. The plurality of processors may be in operative communication with each other and may be collectively configured to perform one or more functionalities of the provisioning apparatus 108 as described herein. The plurality of processors may be embodied on a single computing device or distributed across a plurality of computing devices collectively configured to function as the provisioning apparatus 108. In some example embodiments, the processor 140 is configured to execute instructions stored in the memory 142 or otherwise accessible to the processor 140. These instructions, when executed by the processor 140, may cause the provisioning apparatus 108 to perform one or more of the functionalities of the provisioning apparatus 108 as described herein. As such, whether configured by hardware or software methods, or by a combination thereof, the processor 140 may comprise an entity capable of performing operations according to embodiments of the present invention while configured accordingly. Thus, for example, when the processor 140 is embodied as an ASIC, FPGA or the like, the processor 140 may comprise specifically configured hardware for conducting one or more operations described herein. Alternatively, as another example, when the processor 140 is embodied as an executor of instructions, such as may be stored in the memory 142, the instructions may specifically configure the processor 140 to perform one or more algorithms and operations described herein.

The memory 142 may comprise, for example, volatile memory, non-volatile memory, or some combination thereof. In this regard, the memory 142 may comprise a non-transitory computer-readable storage medium. Although illustrated in FIG. 5 as a single memory, the memory 142 may comprise a plurality of memories. The plurality of memories may be embodied on a single computing device or may be distributed across a plurality of computing devices collectively configured to function as the provisioning apparatus 108. In various example embodiments, the memory 142 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 142 may be configured to store information, data, applications, instructions, or the like for enabling the provisioning apparatus 108 to carry out various functions in accordance with various example embodiments. For example, in some example embodiments, the memory 142 is configured to buffer input data for processing by the processor 140. Additionally or alternatively, the memory 142 may be configured to store program instructions for execution by the processor 140. The memory 142 may store information in the form of static and/or dynamic information. The stored information may include, for example, one or more data resources. This stored information may be stored and/or used by the provisioning circuitry 148 during the course of performing its functionalities.

The communication interface 144 may be embodied as any device or means embodied in circuitry, hardware, a computer program product comprising computer readable program instructions stored on a computer readable medium (for example, the memory 142) and executed by a processing device (for example, the processor 140), or a combination thereof that is configured to receive and/or transmit data from/to another computing device. According to some example embodiments, the communication interface 144 is at least partially embodied as or otherwise controlled by the processor 140. In this regard, the communication interface 144 may be in communication with the processor 140, such as via a bus. The communication interface 144 may include, for example, an antenna, a transmitter, a receiver, a transceiver and/or supporting hardware or software for enabling communications with one or more remote computing devices. The communication interface 144 may be configured to receive and/or transmit data using any protocol that may be used for communications between computing devices. In this regard, the communication interface 144 may be configured to receive and/or transmit data using any protocol that may be used for transmission of data over a wireless network, wireline network, some combination thereof, or the like by which the provisioning apparatus 108 and one or more computing devices or computing resources may be in communication. As an example, the communication interface 144 may be configured to enable communication between the provisioning apparatus 108 and one or more of intermediary apparatus 104 or subscriber database 110 over a network (for example, the network 112). The communication interface 144 may additionally be in communication with the memory 142, and/or provisioning circuitry 148, such as via a bus.

The provisioning circuitry 148 may be embodied as various means, such as circuitry, hardware, a computer program product comprising computer readable program instructions stored on a computer readable medium (for example, the memory 142) and executed by a processing device (for example, the processor 140), or some combination thereof and, in some example embodiments, is embodied as or otherwise controlled by the processor 140. In embodiments wherein the provisioning circuitry 148 is embodied separately from the processor 140, the provisioning circuitry 148 may be in communication with the processor 140. The provisioning circuitry 148 may further be in communication with one or more of the memory 142, or communication interface 144, such as via a bus.

In accordance with various example embodiments, a user may purchase the mobile apparatus 102 and/or a subscription to use the mobile apparatus 102 to access a network (for example, an operator network). In order to obtain network access credentials to enable usage of the mobile apparatus 102 on the network, a local connection 106 may be established between the mobile apparatus 102 and an intermediate apparatus 104. In some example embodiments, the intermediate apparatus 104 may be located at a point of sale (for example, a store) where the mobile apparatus 102 and/or a network subscription were purchased.

The provisioning circuitry 148 of the provisioning apparatus 108 may be configured to provide an interface for communicating with the intermediary apparatus 104 via the network 112. Accordingly, the provision facilitation circuitry 138 of the intermediary apparatus 104 may be configured to determine information about the mobile apparatus 102, information about the user of the mobile apparatus 102, and/or the like that may be needed to enable the provisioning apparatus 108 to provision network access credential information to the mobile apparatus 102. The provision facilitation circuitry 138 may be further configured to provide that information to the provisioning apparatus 108 to enable provisioning of network access credential information to the mobile apparatus 102.

In some example embodiments, the provisioning circuitry 148 may be configured to provide a web interface. As an example, a network operator responsible for controlling access to the operator network and managing the provisioning apparatus 108 may implement a web page accessible by the intermediary apparatus 104 by which device and/or user information may be entered and submitted to the provisioning apparatus 108. As another example, the intermediary apparatus 104 may be configured to access a service portal having a listing of a plurality of network operators approved to provision network access credentials to the mobile apparatus 102. A network operator may be selected from the listing and an application (for example, a web browser) of the intermediary apparatus may be directed to a web page or other interface for that operator. In embodiments wherein a web interface provides an interface for the intermediary apparatus 104 to transfer information to the provisioning apparatus 108, Transport Layer Security (TLS), Secure Sockets Layer (SSL), and/or the like may be used for mutual authentication of the intermediary apparatus 104 and provisioning apparatus 108, for securing communications between the intermediary apparatus 104 and provisioning apparatus 108, and/or the like.

The provision facilitation circuitry 138 may accordingly be configured to determine a manufacturer of the mobile apparatus 102, model of the mobile apparatus 102, user data for the user of the mobile apparatus 102, payment information for the mobile apparatus 102, payment information for a network access subscription, and/or the like and provide the information to the provisioning apparatus 108. In embodiments wherein the provisioning circuitry 148 is configured to provide a web interface, a user of the intermediary apparatus 104 may enter at least some of the information into the web interface so that it may be submitted to the provisioning apparatus 108. The payment information may, for example, comprise a ticket or other proof of payment that may be recognized by the network operator as proof that the mobile apparatus 102 and/or network access rights for using the mobile apparatus 102 on a network have been validly purchased by a user of the mobile apparatus 102.

The intermediary apparatus 104 may obtain an application, data package, or the like comprising a trusted operator identity, which may be signed by a manufacturer of the mobile apparatus 102. The trusted operator identity may, for example, comprise a certificate of the network operator, a cryptographic key(s) associated with the network operator that may be shared with other entities to facilitate verification of items signed and/or encrypted by the operator, and/or the like. The provision facilitation circuitry 138 may be configured to cause the trusted operator identity to be provided to the mobile apparatus 102 via the local connection 106. The setup circuitry 128 may be configured to validate the trusted operator identity, such as based on the manufacturer signature. In some example embodiments, the setup circuitry 128 may be configured to validate the trusted operator identity in a secure environment of the mobile apparatus 102. In an instance in which the trusted operator identity is properly validated, the setup circuitry 128 may regard the trusted operator identity as trustworthy and store the trusted operator identity (for example, securely) in the memory 122.

The setup circuitry 128 may be configured to provide a trusted device identity for the mobile apparatus 102 to the intermediary apparatus 104. The trusted device identity for the mobile apparatus 102 may, for example, comprise a device certificate for the mobile apparatus 102, a cryptographic key(s) associated with the mobile apparatus 102 that may be shared with other entities to facilitate verification of items signed and/or encrypted by the mobile apparatus 102, and/or the like. The setup circuitry 128 may, for example, provide the trusted device identity to the intermediary apparatus 104 in response to a request received from the intermediary apparatus 104. In some example embodiments, the setup circuitry 128 may sign the trusted device identity, for example using a previously received and stored trusted operator identity. In embodiments wherein the setup circuitry 128 is configured to sign the trusted device identity, the setup circuitry 128 may sign the trusted device identity in a secure environment of the mobile apparatus 102. In some example embodiments, the setup circuitry 128 may be further configured to provide a preliminary International Mobile Subscriber Identity (IMSI) that may be assigned to the mobile apparatus 102 to the intermediary apparatus 104. Further, in some example embodiments, the setup circuitry 128 may be configured to cause a unique assigned identifier of the mobile apparatus 102 (for example, an International Mobile Equipment Identity (IMEI), or the like) to be provided to the intermediary apparatus 104. This unique assigned identifier may be used by a network operator to ensure that the mobile apparatus 102 has not been registered as stolen. In embodiments wherein the setup circuitry 128 provides a preliminary IMSI, unique assigned identifier, and/or other information to the intermediary apparatus 104 in addition to the trusted device identity, the additional information may be signed using the trusted operator identity (for example, in a secure environment of the mobile apparatus 102).

The provision facilitation circuitry 138 may receive the trusted device identity. The provision facilitation circuitry 138 may be further configured to receive the preliminary IMSI, unique assigned identifier, and/or the like in embodiments where provided to the intermediary apparatus 104. The provision facilitation circuitry 138 may forward the received item(s) (for example, the trusted device identity, preliminary IMSI, unique assigned identifier, and/or the like) to the provisioning apparatus 108 to enable the provisioning apparatus 108 to provision network access credential information to the mobile apparatus 102. As an example, the provision facilitation circuitry 138 may set up a secure Hypertext Transfer Protocol (HTTPS) request with the provisioning apparatus 108 to provide the trusted device identity to the provisioning apparatus 108. In some example embodiments, the provision facilitation circuitry 138 may be configured to sign and/or encrypt the trusted device identity (for example, in a secure environment of the intermediary apparatus 104) and/or other received item(s) prior to forwarding to the provisioning apparatus 108.

The provisioning circuitry 148 may receive the trusted device identity. In embodiments wherein the trusted device identity is encrypted based on the trusted operator identity, the provisioning circuitry 148 may use a locally available copy of the trusted operator identity or key associated therewith to decrypt and verify the trusted device identity. The provisioning circuitry 148 may, for example, perform such decryption and/or verification in a secure environment of the provisioning apparatus 108. In embodiments wherein a unique assigned identifier for the mobile apparatus 102 is forwarded to the provisioning apparatus 108, the provisioning circuitry 148 may consult with the subscriber database 110, such as by checking against an EIR, to verify that the mobile apparatus 102 has not been registered as stolen.

The provisioning circuitry 148 may be configured to provision network access credential information to the mobile apparatus 102 based at least in part on the trusted device identity. The provisioning circuitry 148 may further base provision of the network access credential information on information about the mobile apparatus 102, information about a user of the mobile apparatus 102 as determined and provided to the provisioning apparatus 108 by the intermediary apparatus 104. The provisioned network access credential information may, for example, comprise, access credentials, cryptographic algorithm(s), network settings, service information, configuration information, and/or the like. In some example embodiments, the provisioned network access credential information may comprise Subscriber Identity Module (SIM) data and may comprise an application (for example, a SIM application) that may be installed on the mobile apparatus 102. The provisioning circuitry 148 may, for example, package the network access credential information in an Open Mobile Alliance Device Management (OMA DM) object. The provisioning circuitry 148 may further encrypt the network access credential information based at least in part on the trusted device identity for the mobile apparatus 102. In embodiments wherein the provisioning circuitry 148 encrypts the network access credential information, the network access credential information may be encrypted in a secure environment of the provisioning apparatus 108.

In some example embodiments, the provisioning circuitry 148 may determine a plurality of available phone numbers and provide a choice of those available phone numbers to the intermediary apparatus 104 for selection. The provision facilitation circuitry 138 may be configured to determine a selection (for example, a user selection) of a phone number from the available phone numbers and cause an indication of the selected phone number to be provided to the provisioning apparatus 108. The provisioning circuitry 148 may receive the indication of the selected phone number and may provision the network access credential information to the mobile apparatus 102 further based on the selected phone number.

In some example embodiments, the mobile apparatus 102 may have an existing or previously assigned phone number for use on an old operator that the user wants to transfer to a new operator (for example, the operator of the network for which the provisioning apparatus 108 is configured to provision network access credential information). In such embodiments, the provisioning circuitry 148 may be configured to facilitate transfer of the number to the new operator in accordance with any protocol for transfer of phone numbers between network operators. As an example, the provisioning circuitry 148 may be configured to facilitate transfer of the phone number to the new operator for use with a subscription for access to the network of the new operator in accordance with the procedure set forth in TR 33.812.

The provisioning circuitry 148 may be further configured to send the provisioned network access credential information to the intermediary apparatus 104. As an example, the provisioning circuitry 148 may send the provisioned network access credential information in an HTTPS response message.

The provision facilitation circuitry 138 may be configured to forward the received network access credential information to the mobile apparatus 102 via the local connection 106. In some example embodiments, the provision facilitation circuitry 138 may be configured to sign the received network access credential information (for example, in a secure environment of the intermediary apparatus 104) prior to forwarding to the mobile apparatus 102. The setup circuitry 128 may receive the network access credential information and use the network access credential information to configure the mobile apparatus 102 to access the operator's network in accordance with a configuration(s) specified by the network access credential information. In some example embodiments, the setup circuitry 128 may be configured to hand the network access credential information to a secure environment of the mobile apparatus 102 and use the network access credential information to configure the mobile apparatus 102 within the secure environment. In embodiments wherein the network access credential information comprises an installable application (for example, a SIM application), the setup circuitry 128 may configure the mobile apparatus 102 at least in part by installing the application. In instances wherein the mobile apparatus 102 has been configured with network access credentials for a plurality of network operators (for example, with a plurality of SIMs), the setup circuitry 128 may be configured to inform a radio module (for example, a radio module of the communication interface 124) of the newly configured access credential information.

In embodiments wherein the provisioning circuitry 148 encrypts the network access credential information based on the trusted device identity, the setup circuitry 128 may be further configured to use the trusted device identity to decrypt and unpack the network access credential information prior to configuring the mobile apparatus 102. In such embodiments, the setup circuitry 128 may decrypt and unpack the network access credential information in a secure environment of the mobile apparatus 102. In some example embodiments, the provisioning circuitry 148 may include a random value or other error checking information in the provisioned network access credential information. In such embodiments, the setup circuitry 128 may utilize the error checking information to verify correct delivery of the provisioned network access credential information prior to using the network access credential information to configure the mobile apparatus 102.

The setup circuitry 128 may be further configured to generate a confirmation message confirming validation and/or installation of the received network access credential information. The setup circuitry 128 may sign the confirmation message using the trusted operator identity (for example, in a secure environment of the mobile apparatus 102) and may include a random value or other error checking information in the confirmation message. The setup circuitry 128 may cause the confirmation message to be provided to the intermediary apparatus 104. The provision facilitation circuitry 138 may forward the confirmation message to the provisioning apparatus 108. In some example embodiments, the provision facilitation circuitry 138 may be configured to sign the confirmation message (for example, in a secure environment of the intermediary apparatus 104) prior to forwarding the confirmation message to the provisioning apparatus 108. The provision facilitation circuitry 138 may be further configured to delete any copy of the provisioned network access credential information that may be locally stored on the intermediary apparatus 104, such as in the memory 132.

The operator (for example, the provisioning circuitry 148) may activate the subscription. Attendant to activation of the subscription, the provisioning circuitry 148 may cause the provisioned network access credential information to be stored in the subscriber database 110. Subsequent to activation of the subscription, the mobile apparatus 102 may use the subscription to access the operator's network based on the provisioned network access credential information.

The provisioning circuitry 148 may initially provision the mobile apparatus 102 with a default Personal Identification Number (PIN), such as 1234. The user of the mobile apparatus 102 may later change the default PIN. In order to change the PIN, the user may have to provide a PIN Unlock Code (PUC), which may, for example, be provided to the mobile apparatus 102 subsequent to subscription activation and connection to the operator's network, such as by a short message service (SMS) message. As another example, the PUC may be sent to an email address for the user that is registered with the network operator.

Figure 6:
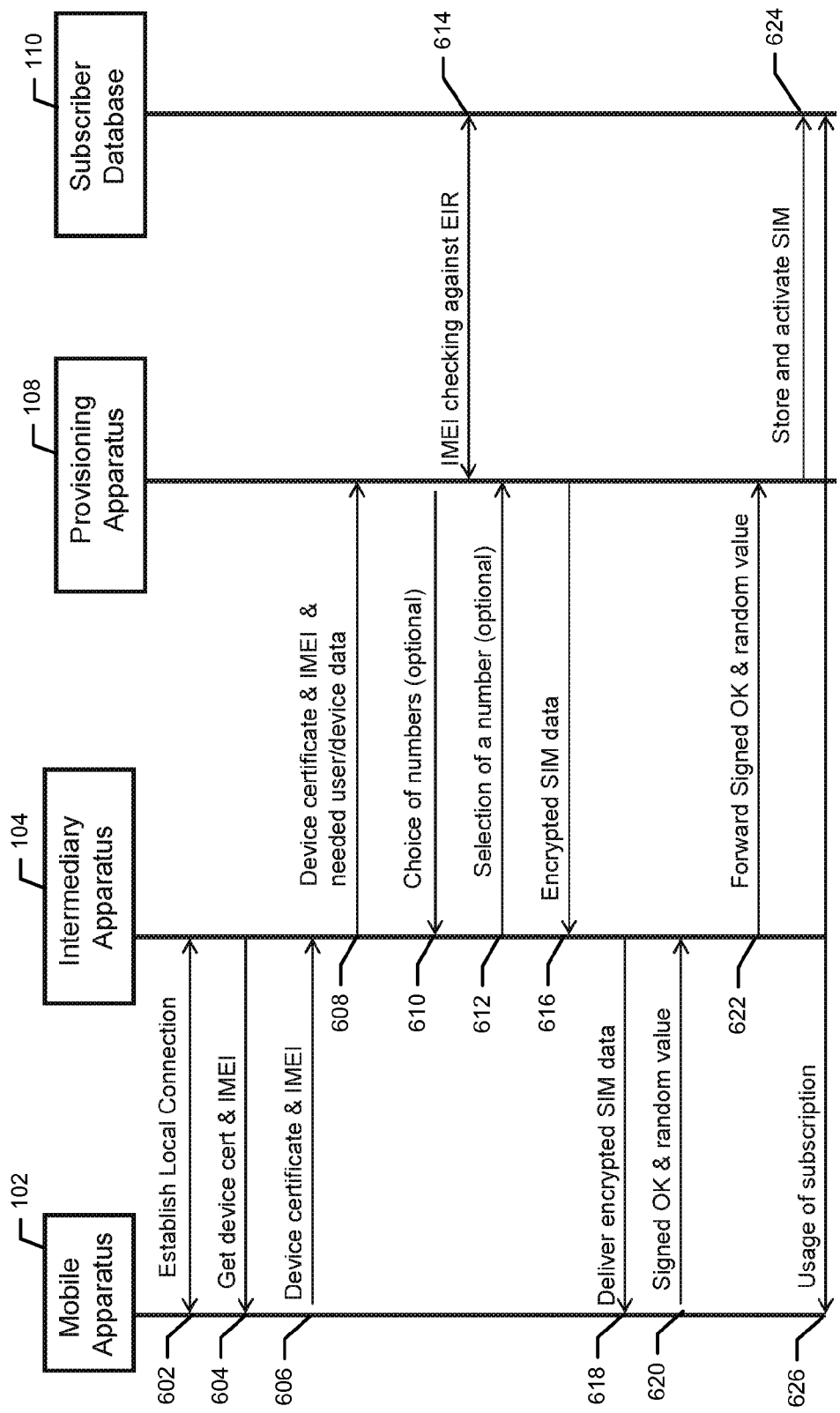
FIG. 6 illustrates a signaling diagram of signals that may be exchanged between entities of a system for access credential provisioning according to some example embodiments.

Referring now to FIG. 6, FIG. 6 illustrates a signaling diagram of signals that may be exchanged between entities of a system for access credential provisioning according to some example embodiments. Operation 602 may comprise the mobile apparatus 102 and intermediary apparatus 104 establishing a local connection (for example, the local connection 106). Operation 604 may comprise the intermediary apparatus 104 requesting a trusted device identity (for example, a device certificate) and IMEI for the mobile apparatus 102. Operation 606 may comprise the mobile apparatus 102 providing the trusted device identity (for example, the device certificate) and IMEI to the intermediary apparatus 104 via the local connection. Operation 608 may comprise the intermediary apparatus 104 forwarding the trusted device identity (for example, the device certificate) and IMEI to the provisioning apparatus 108. The intermediary apparatus 104 may further provide additional information about the mobile apparatus 102 and/or a user thereof to the provisioning apparatus 108 in operation 608. This additional information, may, for example, have been provided by a user of the intermediary apparatus 104. Operation 610 may optionally comprise the provisioning apparatus 108 determining a plurality of available numbers and providing a choice of the available numbers to the intermediary apparatus 104. Operation 612 may optionally comprise the intermediary apparatus 104 determining a selection of a number and providing an indication of the selection to the provisioning apparatus 108.

Operation 614 may comprise the provisioning apparatus 108 using the IMEI to consult an EIR that may be maintained in the subscriber database 110 in order to ensure that the mobile apparatus 102 has not been registered as stolen. Provided that the mobile apparatus 102 has not been registered as stolen, the provisioning apparatus 108 may provision network access credential information (for example, SIM data) for the operator network to the mobile apparatus 102 based at least in part on the information received in operation 608. The provisioning apparatus 108 may encrypt the SIM data using the trusted device identity (for example, the device certificate). Operation 616 may comprise the provisioning apparatus 108 sending the encrypted SIM data to the intermediary apparatus 104. Operation 618 may comprise the intermediary apparatus 104 delivering the encrypted SIM data to the mobile apparatus 102. The mobile apparatus 102 may decrypt the SIM data and use the SIM data for configuring the mobile apparatus 102 for network access, such as by installing the SIM data. Operation 620 may comprise the mobile apparatus 102 sending a confirmation message to the intermediary apparatus 104. The confirmation message may, for example, comprise an OK message signed using a trusted operator identity (for example, an operator certificate) and including a random value for verification. Operation 622 may comprise the intermediary apparatus 104 forwarding the confirmation message to the provisioning apparatus 108. Operation 624 may comprise the provisioning apparatus 108 storing the SIM in the subscriber database 110 and activating the SIM. Operation 626 may comprise the mobile apparatus 102 using the subscription to access the operator network.

Figure 7:
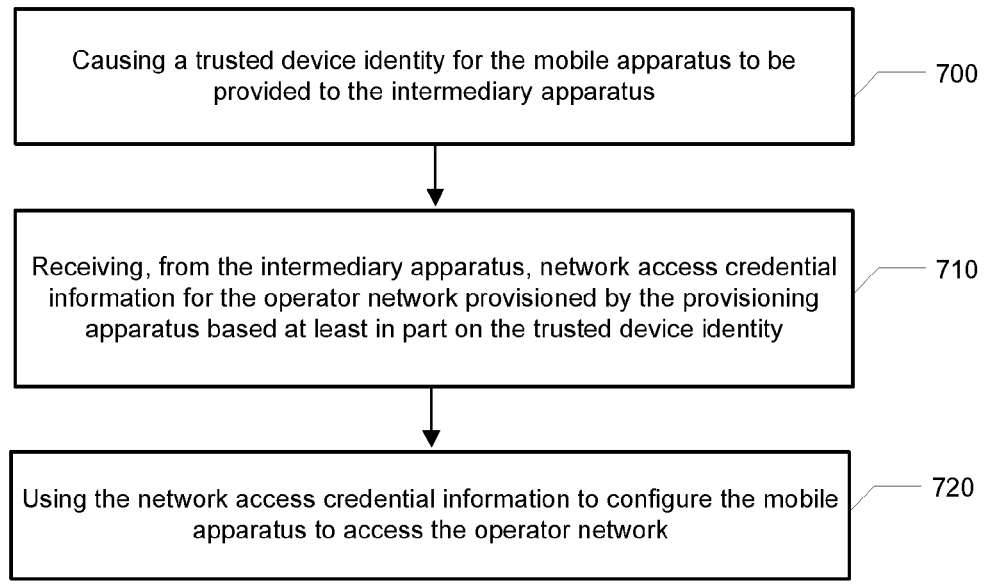
FIG. 7 illustrates a flowchart according to an example method for access credential provisioning according to some example embodiments.

FIG. 7 illustrates a flowchart according to an example method for access credential provisioning according to some example embodiments. In this regard, FIG. 7 illustrates operations that may be performed at the mobile apparatus 102. The operations illustrated in and described with respect to FIG. 7 may, for example, be performed by, with the assistance of, and/or under the control of one or more of the processor 120, memory 122, communication interface 124, user interface 126, or setup circuitry 128. Operation 700 may comprise causing a trusted device identity for the mobile apparatus 102 to be provided to the intermediary apparatus 104. The processor 120, memory 122, communication interface 124, user interface 126, and/or setup circuitry 128 may, for example, provide means for performing operation 700. Operation 710 may comprise receiving, from the intermediary apparatus, network access credential information for the operator network. The network access credential information may have been provisioned to the mobile apparatus 102 by the provisioning apparatus 108 based at least in part on the trusted device identity. The processor 120, memory 122, communication interface 124, and/or setup circuitry 128 may, for example, provide means for performing operation 710. Operation 720 may comprise using the network access credential information to configure the mobile apparatus to access the operator network. The processor 120, memory 122, communication interface 124, user interface 126, and/or setup circuitry 128 may, for example, provide means for performing operation 720.

Figure 8:
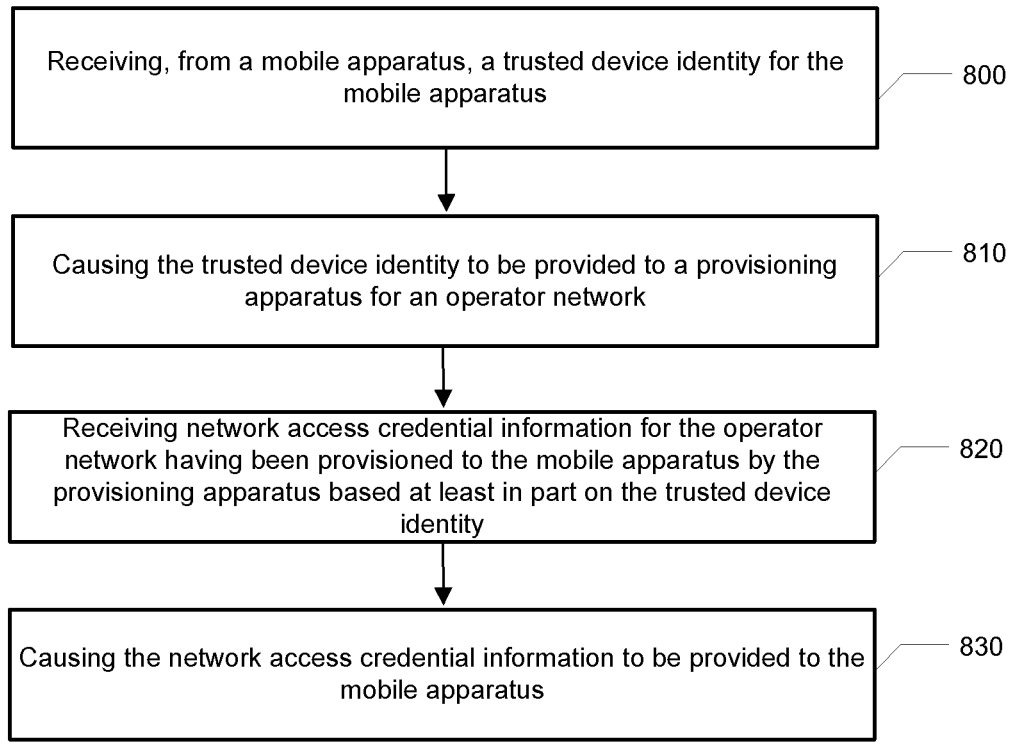
FIG. 8 illustrates a flowchart according to an example method for access credential provisioning according to some example embodiments.

FIG. 8 illustrates a flowchart according to an example method for access credential provisioning according to some example embodiments. In this regard, FIG. 8 illustrates operations that may be performed at the intermediary apparatus 104. The operations illustrated in and described with respect to FIG. 8 may, for example, be performed by, with the assistance of, and/or under the control of one or more of the processor 130, memory 132, communication interface 134, user interface 136, or provision facilitation circuitry 138. Operation 800 may comprise receiving, from a mobile apparatus 102, a trusted device identity for the mobile apparatus 102. The processor 130, memory 132, communication interface 134, user interface 136, and/or provision facilitation circuitry 138 may, for example, provide means for performing operation 800. Operation 810 may comprise causing the trusted device identity to be provided to a provisioning apparatus 108 for an operator network. The processor 130, memory 132, communication interface 134, user interface 136, and/or provision facilitation circuitry 138 may, for example, provide means for performing operation 810. Operation 820 may comprise receiving network access credential information for the operator network. The network access credential information may have been provisioned to the mobile apparatus 102 by the provisioning apparatus 108 based at least in part on the trusted device identity. The processor 130, memory 132, communication interface 134, user interface 136, and/or provision facilitation circuitry 138 may, for example, provide means for performing operation 820. Operation 830 may comprise causing the network access credential information to be provided to the mobile apparatus 102. The processor 130, memory 132, communication interface 134, user interface 136, and/or provision facilitation circuitry 138 may, for example, provide means for performing operation 830.

FIGS. 7-8 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122, in the memory 132, and/or in the memory 142) and executed by a processor in the computing device (for example, by the processor 120, by the processor 130, and/or by the processor 140). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a mobile apparatus 102, intermediary apparatus 104, and/or a provisioning apparatus 108) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a mobile apparatus 102, intermediary apparatus 104, and/or a provisioning apparatus 108) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 120, processor 130, and/or processor 140) may provide all or a portion of the elements. In other example embodiments, all or a portion of the elements may be configured by and operate under control of a computer program product. The computer program product for performing the methods of some example embodiments may include a computer-readable storage medium (for example, the memory 122, memory 132, and/or memory 142), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
causing, by a mobile apparatus, a trusted device identity for the mobile apparatus to be provided to an intermediary apparatus, the intermediary apparatus being configured to serve as an intermediary between the mobile apparatus and a provisioning apparatus for a cellular network;
receiving, at the mobile apparatus, cellular network access credential information for the cellular network, the cellular network access credential information sent by the intermediary apparatus, the cellular network access credential information comprising encrypted subscriber identity module information, the cellular network access credential information provisioned to the mobile apparatus by the provisioning apparatus based at least in part on the trusted device identity, wherein the received cellular network access credential information is encrypted based at least in part on the trusted device identity to enable the received cellular network access credential information to be decrypted based at least in part on the trusted device identity; and sending, by the mobile apparatus, an acknowledgment to the intermediary apparatus, the acknowledgement sent in response to the received cellular network access credential information, the acknowledgement signed using trusted operator identity.

2. The method of claim 1, wherein the causing further comprises causing the trusted device identity to be provided to the intermediary apparatus via a local connection between the mobile apparatus and the intermediary apparatus, and wherein the receiving further comprises receiving the cellular network access credential information via the local connection.

3. The method of claim 1, further comprising:
using the cellular network access credential information to configure the mobile apparatus to access the cellular network in accordance with a configuration specified by the cellular network access credential information.

4. The method of claim 3, further comprising:
using the trusted operator identity to determine whether the cellular network access credential information is valid; and
using the cellular network access credential information to configure the mobile apparatus to access the cellular network only in an instance in which the cellular network access credential information is determined to be valid.

5. The method of claim 1, wherein the received cellular network access credential information is packaged in an Open Mobile Alliance Device Management object.

6. The method of claim 1, further comprising signing the trusted device identity with a trusted operator identity prior to causing the trusted device identity to be provided to the intermediary apparatus.

7. An apparatus comprising at least one processor and at least one memory storing computer program code, wherein the at least one memory and stored computer program code are configured, with the at least one processor, to cause the apparatus to at least:
cause, by the apparatus, a trusted device identity for the apparatus to be provided to an intermediary apparatus, the intermediary apparatus being configured to serve as an intermediary between the apparatus and a provisioning apparatus for a cellular network; and
receive, at the apparatus, cellular network access credential information for the cellular network, the cellular network access credential information sent by the intermediary apparatus, the cellular network access credential information comprising encrypted subscriber identity module information, the cellular network access credential information provisioned to the apparatus by the provisioning apparatus based at least in part on the trusted device identity, wherein the received cellular network access credential information is encrypted based at least in part on the trusted device identity to enable the received cellular network access credential information to be decrypted based at least in part on the trusted device identity; and
send, by the apparatus, an acknowledgment to the intermediary apparatus, the acknowledgement sent in response to the received cellular network access credential information, the acknowledgement signed using trusted operator identity.

8. The apparatus of claim 7, wherein the trusted device identity is provided to the intermediary apparatus via a local connection between the apparatus and the intermediary apparatus, and wherein the cellular network access credential information is received via the local connection.

9. The apparatus of claim 7, wherein the apparatus is further configured to at least:
use the cellular network access credential information to configure the apparatus to access the cellular network in accordance with a configuration specified by the cellular network access credential information.

10. The apparatus of claim 9, wherein the apparatus is further configured to at least:
use the trusted operator identity to determine whether the network access credential information is valid; and
use the cellular network access credential information to configure the apparatus to access the cellular network only in an instance in which the cellular network access credential information is determined to be valid.

11. The apparatus of claim 7, wherein the received cellular network access credential information is packaged in an Open Mobile Alliance Device Management object.

12. The apparatus of claim 7, wherein the apparatus is further configured to at least sign the trusted device identity with a trusted operator identity prior to causing the trusted device identity to be provided to the intermediary apparatus.

13. The apparatus of claim 7, wherein the apparatus comprises or is embodied on a mobile phone, the mobile phone comprising user interface circuitry and user interface software stored on one or more of the at least one memory; wherein the user interface circuitry and user interface software are configured to at least:
facilitate user control of at least some functions of the mobile phone through use of a display; and
cause at least a portion of a user interface of the mobile phone to be displayed on the display to facilitate user control of at least some functions of the mobile phone.

14. A non-transitory computer-readable storage medium including computer program code which when executed by at least one processor causes operations comprising:
causing, by a mobile apparatus, a trusted device identity for the mobile apparatus to be provided to an intermediary apparatus, the intermediary apparatus being configured to serve as an intermediary between the mobile apparatus and a provisioning apparatus for a cellular network;
receiving, at the mobile apparatus, cellular network access credential information for the cellular network, the cellular network access credential information sent by the intermediary apparatus, the cellular network access credential information comprising encrypted subscriber identity module information, the cellular network access credential information provisioned to the mobile apparatus by the provisioning apparatus based at least in part on the trusted device identity, wherein the received cellular network access credential information is encrypted based at least in part on the trusted device identity to enable the received cellular network access credential information to be decrypted based at least in part on the trusted device identity; and
sending, by the mobile apparatus, an acknowledgment to the intermediary apparatus, the acknowledgement sent in response to the received cellular network access credential information, the acknowledgement signed using trusted operator identity.

15. The non-transitory computer-readable storage medium of claim 14, wherein the causing further comprises causing the trusted device identity to be provided to the intermediary apparatus via a local connection between the mobile apparatus and the intermediary apparatus, and wherein the cellular network access credential information is received via the local connection.

16. The non-transitory computer-readable storage medium of claim 14, further comprising:
    using the network access credential information to configure the mobile apparatus to access the cellular network in accordance with a configuration specified by the cellular network access credential information.

17. The computer program product of claim 14, further comprising signing the trusted device identity with a trusted operator identity prior to causing the trusted device identity to be provided to the intermediary apparatus.

\* \* \* \* \*